United States Patent Office 3,545,965
Patented Dec. 8, 1970

3,545,965
CHEMICAL GOLD MINING
Albert L. Jacobs, 521 5th Ave.,
New York, N.Y. 10017
No Drawing. Filed June 27, 1968, Ser. No. 740,460
Int. Cl. C22b 3/00, 11/04
U.S. Cl. 75—101          6 Claims

ABSTRACT OF THE DISCLOSURE

Gold-containing material such as ores, mineral or alluvial deposits and "tailings" from present day modes of gold recovery are treated with $H_2SeO_4$ in a sufficient amount to combine with or extract the gold which is in a free state from the ores, deposits and "tailings," etc., all of which contain free gold in small but varying amounts. When gold and selenic acid are brought into contact with one another they form auric selenate with the evolution of hydrogen. The hydrogen is collected for subsequent reuse in bringing about reduction of the auric selenate to reform the selenic acid and deposit its gold content. Selenic acid $H_2SeO_4$ is normally a solid crystalline material which can be used in the present invention by raising its temperature out of contact with moisture to the melting point (48° C.) by means of waste heat but since selenic acid is deliquescent, it is for practical purposes used in the form of a 40% aqueous solution. By carrying out the procedure in a closed system or area out of contact with moisture where solid $H_2SeO_4$ is used and in a continuous manner with recovery of selenic acid and hydrogen for reuse, the economics of the invention are acceptable even though selenic acid is presently relatively expensive.

---

The present invention relates to chemical gold mining in the sense that gold is extracted from materials containing it by means of chemicals which have not heretofore been used commercially. It has been found that gold reacts with selenic acid $H_2SeO_4$ to form auric selenate $Au_2(SeO_4)_3$ with evolution of hydrogen which is collected for treatment of the auric selenate whereby the selenic acid is reformed and its gold content is deposited and recovered whereafter the process can be carried out on a continuous basis and preferably in a closed system or area to minimize loss or dissipation of hydrogen or heat which is employed in the reaction between the gold and the selenic acid and which heat can be conveniently and economically obtained as waste heat from adjacent equipment such as roasters and the like used in the treatment of ores. The particular advantage of the invention is that it is capable of extracting all or substantially all the gold even from a lean material because of the recovery and reuse, both of the selenic acid and the hydrogen, although it is understood that some losses of heat and chemicals are bound to occur and which are made up from time to time.

The most commonly used procedure for recovering gold from ores aside from the historic "placer" mining is the so-called cyanide process which is generally satisfactory, but which involves very toxic materials and which is relatively expensive. It also has the disadvantage that it does not make possible complete extraction of gold from the ore, mineral or alluvial deposit being used as the source material. The other commonly used method is to amalgamate the gold with mercury, but this has obvious disadvantages and is relatively little used.

According to the present invention gold-containing material such as a lean domestic ore or the "tailings" from the cyanide process is ground to a relatively small, fairly uniform, particle size, not only to free physically the uncombined gold therein, but also to make the maximum amount of such gold content available for chemical combination with selenic acid. Usually also it is best to wash the ore hydraulically so as to remove water-soluble materials, dirt, clay, etc., and usually prior to the hydraulic washing the ore is subjected to moderate heating to remove organic contaminating material. The thus prepared gold-containing material is subjected to reactive contact with selenic acid whereby auric selenate is formed with the evolution of hydrogen according to the reaction I:

$$2Au + 3H_2SeO_4 = Au_2(SeO_4)_3 + 3H_2 \qquad (I)$$

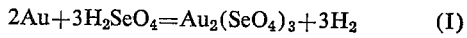

Since selenic acid is normally solid and crystalline, it is necessary to heat the same to the melting point (48° C.) in order to carry out the reaction with the available gold and this can best and most economically be done by using waste heat from some adjacent mining equipment or operation such as that frequently used in the roasting of ores, steam drilling and the like. Since selenic acid is deliquescent, it is for practical purposes used as an aqueous solution, e.g., a 40% solution. During the reaction auric selenate is formed with the evolution of hydrogen (Equation I) and this hydrogen is collected for reuse in subsequently reducing the auric selenate to reform selenic acid and to deposit the gold therefrom in accordance with reaction II:

$$Au_2(SeO_4)_3 + 3H_2 = 3H_2SeO_4 + 2Au \qquad (II)$$

While it might be thought that these reactions would reach an equilibrium because they are capable of being carried out in both directions as will be apparent from the reactions depicted above, such is not actually the case because:

(a) the evolved hydrogen is removed which makes reaction I go more strongly and completely from left to right; and (b) heat is employed which has the same tendency so that any equilibrium established would be of little or no consequence and would be compensated for in the succeeding cycles of operation.

It will be clear from the foregoing reactions that the amount of free or uncombined gold in the starting material should be known or estimated to keep down the selenic acid requirements and then the amount of selenic acid employed must be just enough to combine stoichiometrically according to reaction I, although by analogy to other chemical reactions, it is usually preferable to have at least a slight excess of selenic acid (reactant) present. While the element selenium Se, which has many of the properties of the element sulphur S, is considered to be somewhat toxic, its acid, selenic acid, is little if any more appreciably toxic than sulphuric acid $H_2SO_4$ and furthermore it will be appreciated that mining operations, whether of the present character or of the cyanide type, are carried out in locations where toxicity is no great problem, in which connection the toxicity of selenic acid is considered to be far less than the chemicals involved in the cyanide process and which latter always has the possibility of producing at least some prussic acid HCN which is exceptionally poisonous and dangerous. The cyanides also suffer from the disadvantage that they are not easily or conveniently regenerated or recovered as is the selenic acid here involved.

While it is possible to carry out the present reactions in various types of equipment which form no necessary or essential part of the present invention, it is deemed best to pass the gold-containing material up through an upwardly inclined rotating roaster drum provided internally with screw threadlike protuberances on its inner surface so that as the roaster rotates, the ore fed into the lower end by a conveyor travels up to the higher discharge end of the roaster which is heated externally along its length or middle portions by waste heat and at the same time the selenic acid is introduced at the upper end of the roaster so that as it flows progressively downwardly it makes extensive and relatively prolonged contact with the gold-containing material thereby extracting by chemical reaction all or substantially all the gold content and the auric selenate thus formed is discharged through a special lateral opening near the bottom of the roaster which can be double-walled with a stationary outer shell. The waste ore which has no further use in the present invention is as above stated discharged from the upper end of the rotating roaster and taken to a dump unless other values are present to be extracted. It is, however, possible in some instances to put the gold-containing material and the selenic acid into a large heated vat or other receptacle which has a heating jacket and wherein the heated materials are agitated in contact with one another and thereafter separated. While the evolved hydrogen is largely or completely lost in this type of operation, such is not critical because hydrogen is readily available in tanks or containers under pressure at small expense. The roaster can be replaced as far as the present process is concerned with other equipment which will be understood as suitable by a chemical engineer versed in the beneficiation of ores or the recovery of metal values from lean metal-containing materials. It will further be understood that the present small demand for $H_2SeO_4$ accounts for its relatively high price which will be drastically reduced when the acid is made available in commercial quantities.

What is claimed is:

1. A method of chemical gold mining which comprises extracting gold from a gold-containing material with selenic acid evolving hydrogen, removing said evolved hydrogen and recycling it for treatment of the formed auric selenate to re-form the selenic acid and deposit the extracted gold content of the gold-containing material, the selenic acid being recycled and reused for extracting more gold from additional gold-containing material.

2. A method according to claim 1 which is initiated with solid selenic acid and at a temperature just sufficiently elevated to keep it liquid and out of contact with moisture.

3. A method according to claim 2 which is carried out by using waste heat for temperature maintenance.

4. A method according to claim 1 which is carried out with aqueous selenic acid.

5. A method according to claim 1 which is carried out continuously with a regular feed of gold-containing material, a regular flow of selenic acid thoroughly contacting said gold-containing material for extraction and recovering the re-formed selenic acid obtained when the resulting auric selenate is reduced by the recycled hydrogen.

6. A method according to claim 4 which is carried out in a closed system or area.

References Cited

UNITED STATES PATENTS 3,357,786   12/1967   Giesekus _____ 23—139X

OTHER REFERENCES

Lenher, Victor: Action of Selenic Acid on Gold, in Journal of the American Chemical Society, vol. XXIV, pp. 354–355, 1902. Published by The Chemical Publishing Co., Easton, Pa.

Bagnall, K. W.: The Chemistry of Selenium, Tellurium and Polonium, pp. 62–87, 1966, Chemistry Division, Atomic Energy Research Establishment, Harwell, Berks. (Great Britain). Elsevier Publishing Company, New York, 1966.

L. DEWAYNE RUTLEDGE, Primary Examiner

J. E. LEGRU, Assistant Examiner

U.S. Cl. X.R.

23—50, 139; 75—108, 118